April 1, 1969  N. J. HARRICK ET AL  3,436,159
INTERNAL REFLECTION ELEMENT FOR SPECTROSCOPY WITH
FILM OPTICAL CAVITY TO ENHANCE ABSORPTION
Filed Feb. 4, 1966

INVENTORS
N. J. HARRICK
A. F. TURNER

BY

AGENT

United States Patent Office 3,436,159
Patented Apr. 1, 1969

3,436,159
INTERNAL REFLECTION ELEMENT FOR SPEC-
TROSCOPY WITH FILM OPTICAL CAVITY TO
ENHANCE ABSORPTION
Nicolas J. Harrick, Ossining, and Arthur F. Turner,
Rochester, N.Y.; said Arthur F. Turner assignor to
Bausch & Lomb Incorporated, Rochester, N.Y., a cor-
poration of New York, and said Nicolas J. Harrick,
assignor to North American Philips Co., Inc., New
York, N.Y., a corporation of Delaware
Filed Feb. 4, 1966, Ser. No. 525,223
Int. Cl. G02b 27/32, 1/10, 5/14
U.S. Cl. 356—256                                    6 Claims This invention relates to improved elements for in-
ternal reflection spectroscopy.

Internal reflection spectroscopy is described in detail
in two papers published by N. J. Harrick in "Annals of
the New York Academy or Sciences," vol. 101, Article 3,
pages 928–959 (1963), and "Analytical Chemistry," vol.
36, pages 188–191 (1964), whose contents are hereby
incorporated by reference. The internal reflection cells,
hereinafter called elements, described in these publica-
tions, which include a hemicylinder, a cylindrical rod, or
a thin plate, are composed of infrared transparent ma-
terials of relatively high index of refraction. An infrared
beam is directed through the element so as to impinge on
an outer surface at an angle of incidence greater than
the critical angle for the interface, and thus the beam
totally reflects from the surface and is propagated through
the element. However, if an absorbing material is present
on this outer surface, due to interaction of the absorbing
material with the evanescent beam, absorption of the
beam energy occurs, so-called attenuated total reflection,
so that the emerging beam will exhibit the kind of ab-
sorption spectra that one would encounter in the more
conventional infrared spectrophotometry. The system just
described is now coming into wide use as an analytical
technique. Its special advantages include, for the thin
plate element especially, the possibility of obtaining hun-
dreds of internal reflections inside the element, with
interaction occurring with the absorbing medium at each
reflection, thus enabling weak absorptions to be amplified
and measured.

However, there are limits to the sensitivity of the above-
described techniques, and a point is soon reached where
lengthening of the plate to increase the number of in-
ternal reflections introduces other detrimental effects that
offset any amplified absorptions that may result. In addi-
tion, increasing the size of the plate requires a larger
sample of the material being analyzed. There is a need
in the art not only for a more sensitive apparatus, but also
for an apparatus capable of detecting and analyzing only
small samples of some unknown material.

The principal object of our invention is to provide an
improved element for internal reflection spectroscopy in
which enhanced absorption of the radiation in the ab-
sorbing medium occurs.

We achieve the above-stated object by adding to the
conventional internal reflection element two thin film
coatings to produce what might be described as a frus-
trated total reflection optical cavity. The additional coat-
ings incorporate two sections, the first for amplitude
matching and the second for phase adjustment. The first
or inner coating is essentially a frustrated total reflection
(FTR) film, on top of which is provided the second or
outer phase adjusting film in the form of an interference
film. On the other surface of the latter exists the ab-
sorbing medium. The character of the inner coating, i.e.,
its thickness and index of refraction, is chosen or ad-
justed so that the incident beam sees or experiences a
reflectivity that substantially equals the reflectivity at the
interface of the outer coating with the absorbing medium.
As a consequence, the radiation entering the outer film
becomes trapped within it, and thus, for each incident
ray, the radiation or light may suffer many reflections.
The higher the Q of the cavity represented by the outer
film, the more reflections that the radiation will undergo.
The total system represents a high Q optical cavity with
an absorbing layer located on the free surface in the
absorption-sensitive loop of its standing wave pattern. In
other words, since the light or radiation trapped within
the outer film is contained due to total reflections, the E-
value of the electromagnetic field may be very large at
its outer surface, which further enhances the already
strong interaction with an adsorbed film present.

As will be clear from the foregoing, the system will
produce the desired amplified absorption for only a par-
ticular wavelength of the radiation. Thus, the system can
be tailored to be extraordinarily sensitive to a particular
absorbing medium. However, it is also possible to change
or tune the resonance frequency of the cavity by changing
the angle of incidence of the beam of radiation and thus
make the system exhibit this extraordinary sensitivity
over a range of wavelengths.

The invention will now be described in greater detail
with reference to the acompanying drawings, in which:

FIG. 1 illustartes one form of infrared spectrometer
employing an internal reflection element in accordance
with the invention;

Figure 1:
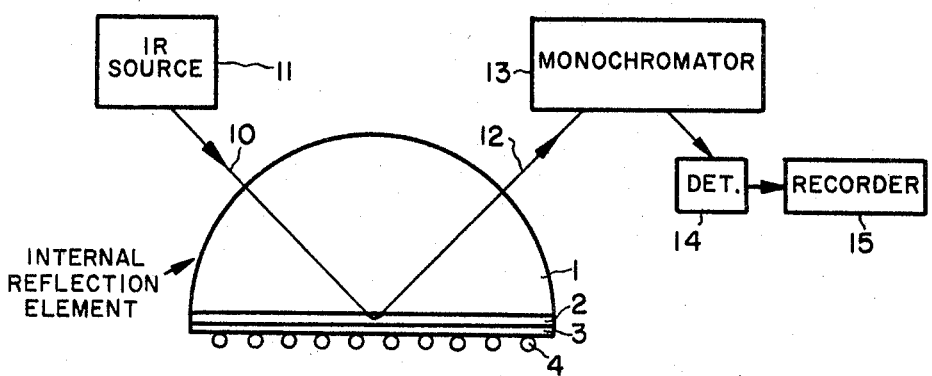

FIG. 1 illustrates, schematically, an infrared spectrom-
eter employing one form of the improved internal reflec-
tion element of the invention. The internal reflection ele-
ment comprises a hemicylinder 1 of infrared transparent
material and of relatively high index of refraction. On
its planar side is provided a frustrated total reflection
(FTR) film 2 of the order of one wavelength thick and
of relatively low index of refraction, and on the latter is
provided an interference film 3 having a relatively high
index of refraction and also having a thickness of the
order of a wavelength. The film thickness is exaggerated
in the drawing. The absorbing medium is represented by
the small circles 4 on the outer surface of the interference
film 3. Incident on the convex side of the hemicylinder
1 is a beam of infrared radiation 10 emanating from a
conventional source 11. The emerging beam from the ele-
ment 1 is referred to by reference numeral 12 and, as in
the conventional spectrometer, is then monochromatized
13 and the single wavelength beam thus produced is de-
tected by a conventional detector 14 and its intensity re-
corded in the usual XY recorder 15. The recorder thus
produces spectra of beam intensity as a function of the
wavelength in the infrared radiation beam 10. If the ab-
sorbing medium 4 is capable of absorbing the beam radi-
ation, then the usual absorption bands will appear in the
resultant spectra at the appropriate wavelengths. The in-
ternal reflection element differs from the conventional ele-
ments described in the above-noted publications by the
presence of the two films 2 and 3. As explained earlier,
the object is to enhance the absorption in the absorbing
medium or film 4, and the films 2 and 3 are constructed
to induce high values of absorbance in the absorbing thin
film 4. This will be better understood from the explanation which follows below of the properties exhibited by the FTR and interference films.

Figure 2:
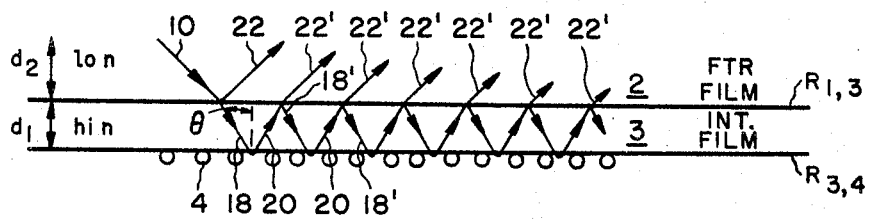
FIG. 2 shows the films of the interal reflection element
of FIG. 1 in its interaction with an incident beam.

FIG. 2 shows the interference film 3 with the absorbing film referred to by reference numeral 4 on its bottom exposed surface. The interference film exhibits a relatively high index of refraction compared with the FTR film 2. The incident beam 10 on the interface results in a transmitted component 18, and a reflected component 22. As will be clear from the above-noted publications, a beam 18 incident on the interface of the interference film 3 and the outside environment or absorbing film 4 at an angle θ exceeding the critical angle actually penetrates slightly into the absorbing medium and thus interacts with the molecules of the absorbing medium. Thus, the beam 20 which reflects from that interface will be reduced in intensity by the energy absorbed in the absorbing film. Thus, the reflectivity $R_{3,4}$ at the interface will be equal to 100–A, where the value 100 represents the reflectivity at total reflection, and A represents the energy absorbed by the absorbing film 4. The reflected beam referred to by reference numeral 20 upon impinging upon the interface between the interference film and the FTR film will undergo a partial reflection represented by the component referred to be numeral 18' and a partial transmission represented by the component referred to by numeral 22', which reflections and transmissions will continue along the length of the interface as shown, but decreasing in magnitude, producing the reflected components referred to by reference numerals 18' and the transmitted components referred to by reference numerals 22'. As is well known in connection with conventional interference films, by adjusting the thickness $d_1$ of the interference film 3— knowing also the angle of incidence θ, the refractive index $n$ of the interference film, and the phase change that occurs when the beam penetrates the absorbing medium 4— one can control the phase of the transmitted components 22' so that they are effectively 180° out of phase with the component 22, as occurs in, for example, the so-called anti-reflecting coating. This 180° phase adjustment is effective for those wavelengths of the incident beam for which the optical thickness of the interference film effectively equals a whole number of half wavelengths, which of course depends upon the angle of incidence θ and the refractive index of the interference film and the phase changes occurring at its interfaces. Thus, to intensify the interaction for a particular absorption band, one chooses a thickness $d_1$ and an angle of incidence such that the required 180° phase relationship of the transmitted components 22 and 22' occurs. As will be further evident, with a fixed thickness $d_1$ of the interference film, variations of the angle of incidence θ, which nevertheless must always exceed the critical angle, will enable the cavity represented by the interference film 3 to become resonant or tuned to different wavelengths.

As will be further evident to those skilled in this art, adjusting the phase of the reflected and transmitted components 22 and 22' by means of the interference film is a necessary but not sufficient condition to completely cancel the reflected and transmitted components and thus insure that the radiation is indeed confined to the interference film. The second essential requirement is to match the amplitudes of the reflected component 22 to the sum of the transmitted components 22'. (For completeness sake, it is noted that amplitudes, not intensities, are to be matched, where amplitude equals the square root of the intensity).

The function of matching the amplitudes to achieve cancellation is effected by the character of the FTR film 2, which thus determines the reflectivity $R_{1,3}$ seen by the incident beam. Reference is further made to United States Patent No. 2,601,806 for a description of the technical requirements for constructing the FTR film 2 to provide the required reflectivity $R_{1,3}$ to match $R_{3,4}$. As will be evident, the FTR film generally has a relatively low index of refraction compared with the interference film 3 and a thickness which, together with the angle of incidence, is chosen to provide the required reflectivity. With the phase properly adjusted by the thickness and angle of incidence in the interference film, and the amplitudes matched by the thickness and composition of the FTR film 2, substantially complete absorption for one wavelength of a linearly polarized incident beam in a particular absorbing medium 4 can be achieved. As a consequence, it is possible at that one wavelength to provide a sharp attenuation of the emerging beam 12 with only extremely thin layers or small quantities of the absorbing medium 4.

Figure 3:
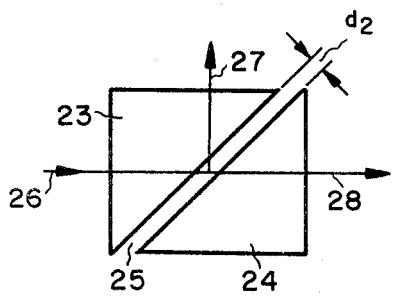
FIGS. 3 and 4 illustrate the manner in which the inner
film can be adjusted to control the reflectivity seen by
the incident beam.
Figure 4:
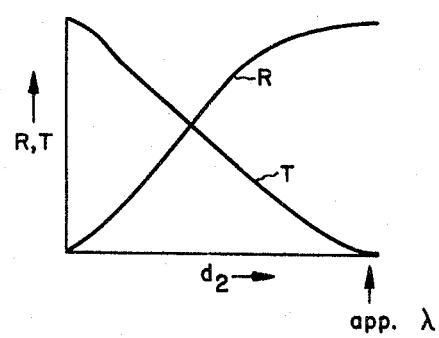

The operation of the FTR film 2 will be better understood with reference to FIGS. 3 and 4. FIG. 3 shows the well-known combination of two prisms 23 and 24 separated by an FTR layer of material 25 of lower index of refraction having a thickness $d_2$. A beam of incident radiation 26 incident on the interface of the low index material will generate a reflected component 27 and a transmitted component 28. The magnitude of those two components will depend upon the thickness $d_2$ of the low index material 25, which is illustrated in the curves of FIG. 4. FIG. 4 plots the magnitude of the transmitted component T and reflected component R as a function of the spacing $d_2$. It can readily be seen that the reflectivity of the device can be adjusted to any desired value by an appropriate adjustment of the thickness $d_2$. Similarly, one can by appropriate adjustment of the thickness $d_2$ of the FTR film 2 control the reflectivity $R_{1,3}$ to match that, $R_{3,4}$, of the interface with the absorbing medium.

Figure 5:
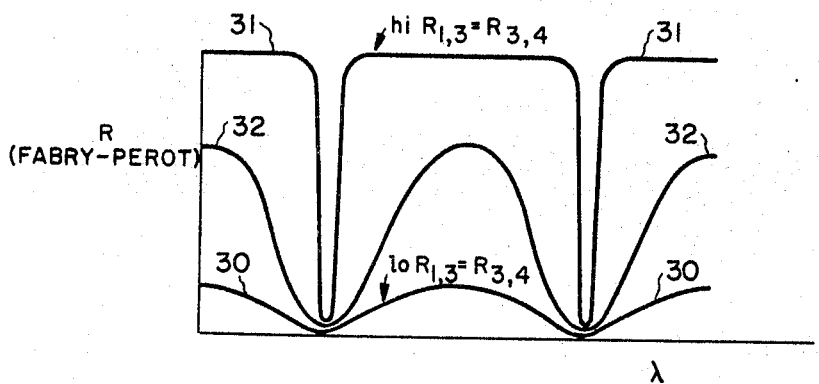
FIG. 5 shows curves illustrating properties of an in-
terference film.

FIG. 5 shows curves, which are available in the published literature, which illustrate the net reflected power as a function of wavelength of a conventional Fabry-Perot interference film, equivalent to the interference film 3 of the internal reflection element of the invention. The net reflected power by the interference film is plotted along the ordinate for different values of the reflectivity $R_{1,3}$ and $R_{3,4}$. In all cases, the two reflectivities are alike. Curve 30 illustrates the case where the reflectivities are relatively low. Curve 31 is a curve demonstrating the effect where the reflectivities are very high, and curve 32 is for an intermediate case. As will be noted, the higher the reflectivity at the interference film, the narrower are the wavelengths of the trapped radiation. In other words, the situation corresponding to the curve 31 corresponds to a high Q optical cavity. The power not reflected is absorbed (or transmitted in the case of the ordinary Fabry-Perot structure).

Figure 6:
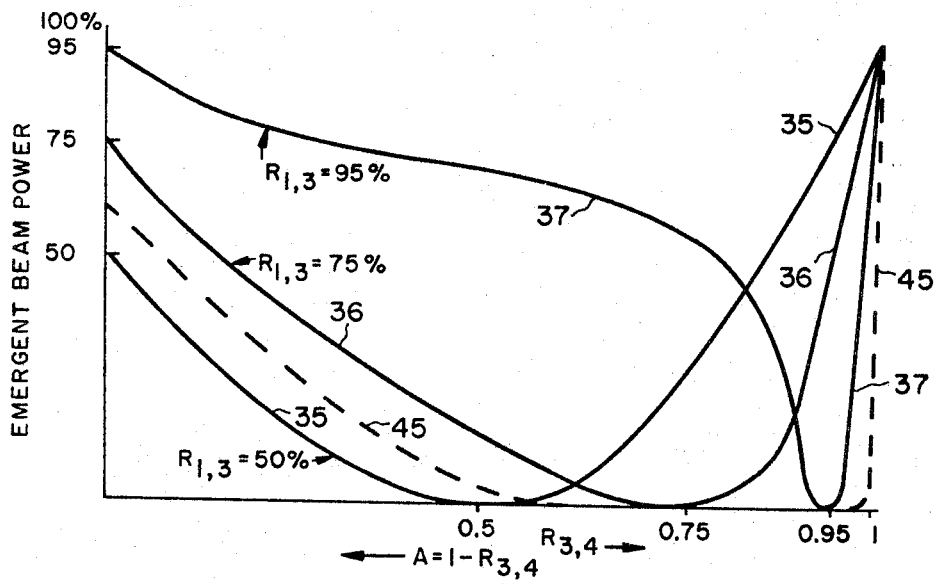
FIG. 6 shows curves illustrating the operation of one
form of the internal reflection element of the invention.

Applying the foregoing analysis to the case at hand, one can derive the curves illustrated in FIG. 6. In FIG. 6 is plotted the power of the emergent beam 12 of FIG. 1 as a function of the reflectivity of the interface with the absorbing medium $R_{3,4}$, which is equal to 1 minus the absorptance A of the absorbing medium 4. Curves are provided for three cases. In the first case, curve 35, reflectivity $R_{1,3}$ is equal to 50%. As will be noted, where no absorbing medium is present, corresponding to the intersection of the X and Y axes, 50% of the incident beam emerges. Similarly, for the case where the reflectivity $R_{3,4}=100\%$, then obviously total reflection exists without frustration and the whole incident beam emerges. Between these point, the emergent beam power falls to zero when the reflectivity $R_{3,4}=50\%$ and therefore equals the reflectivity $R_{1,3}$. The same considerations apply in deriving the curves 36 and 37 for the cases where the reflectivity $R_{1,3}$ is 75% and 95%, respectively. As will be observed from a study of these curves, the absorptance, the converse of the power in the emergent beam 12, becomes, sharper, corresponding to curve 37, as the reflectivity $R_{1,3}$ increases. Similarly, as the absorbance increases, the curve widens, and also the power in the emergent beam with an infinitely thick layer of the absorbant medium can at most equal 50%, corresponding to the curve 35. This means that the advantages afforded by the invention will be realized primarily when very thin layers of weakly absorbing material are to be analyzed, because it means that one would be working with curves similar to curve 37 wherein very strong and sharp absorption bands can be obtained despite the presence of only a minute amount of the sample.

Figure 7:
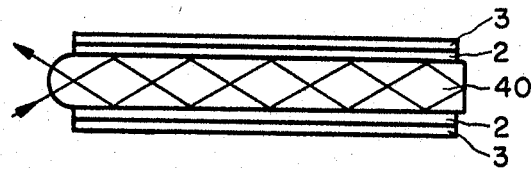
FIG. 7 shows a thin plate modification.

FIG. 7 shows a modification of the hemicylinder geometry illustrated in FIG. 1. In FIG. 7, a thin plate 40 of the type described in the aforementioned publications is provided on one or both of its major surfaces with the FTR film 2 and interference film 3 in accordance with the invention. The same principles of operation are present, except that due to multiple reflection within the thin plate or element itself, the likelihood of achieving the complete absorption sought for is improved. The effect can also be illustrated by the dashed line curve 45 in FIG. 6 for the case where $R_{1,3}=95\%$ and with 10 reflections in the plate 40. As will be noted, matching of the reflectivities is not as critical to maintain the complete absorption, but instead the region of high absorption is now widened to occur over a larger range of values of the reflectivity at the interface with the absorbing medium. Compare curve 45 with multiple reflections with the curve 37 for a single reflection. This has the advantage of compensating for any deviations in the collimated beam and for other disturbances in the system.

As will be evident from the foregoing analysis, the system requires that the incident beam be well collimated to insure that the proper phase relationships are maintained in the interference film element so that cancillation is indeed obtained. In addition, it will further be evident that, since the phase change and reflectivity at a reflecting interface is in general different for the two polarization components of the beam, in most cases it is possible to obtain the desired results by the appropriate adjustments as previously described only for either the $p$ or $s$ component. Therefore, it is desirable to employ a polarizer in the system to insure that only the desired component is entering the internal reflection element of the invention. In most cases, since the absorption is always higher for the $p$ component, it is preferred to employ that component in the system of the invention. The invention is applicable for all wavelengths with which conventional spectroscopy is utilizable, though the most important areas will be for spectroscopy in the ultra-violet and infrared range. Materials and other techniques applicable to the invention can be readily derived from the publications and patent referred to above.

Several examples of internal reflection elements of the invention constructed for detecting a certain absorption are now given as a further illustration of the manner in which the invention may be applied.

Example 1

Water has an absorption band at 2.9 microns. The object is to devise an internal reflection element in accordance with the invention which would enhance the absorption at that particular wavelenth when a certain thickness of a water film is present, in this particular case a thickness of 1.45 microns. We chose as our internal reflection element a germanium body in the form of a hemicylinder as shown in FIG. 1, which has the advantage that the angle of incidence may be varied by rotating the cylinder. However, with a fixed known angle of incidence, one may use a prism with flat entrance and exiting surfaces provided of course that the beam is properly collimated. For the FTR film is chosen barium fluoride $BaF_2$. It is given a thickness of 0.435 micron. The phase adjustment or interference film is a coating of germanium on top of the $BaF_2$ film. It has a thickness of 0.35 micron. The angle of incidence is 30°. The index of refraction of the germanium body is 4, that of the germanium film is 3.8, and that of the barium fluoride is 1.47. The design is for the p-component.

Example 2

The absorption band involved here is for the C–H bond which has a reasonance at 34 microns. The design is for the $s$-component. The internal reflection element chosen was a silicon multiple-reflection plate ($n=3.5$) for a 30° external angle of incidence. The FTR film was $SiO_2$ ($n=1.45$), and the interference film was Ge ($n=3.8$) with a thickness of 0.115 micron. The table below indicates appropriate thicknesses of the FTR film for different assumed values of the reflectivity $R_{1,3}$:

| $R_{1,3}$ | $d_2$ (FTR film), microns |
|---|---|
| 99% | 1.3 |
| 95% | 0.9 |
| 90% | 0.7 |

Of course, it will be appreciated that while, ideally, the reflectivity $R_{1,3}$ should be chosen to match exactly the reflectivity (1–A) at the absorbing medium, which would result in complete extinction of the chosen wavelength, in practice even with a substantial mismatch an enhancement of the absorption will occur. This means that our improvement can be employed in analysis of a wide variety of substances having an absorption band close to the chosen wavelength in the form of films of various thicknesses.

While we have described our invention in connection with specific embodiments and applications, other modifications thereof will be readily apparent to those skilled in this art without departing from the spirit and scope of the invention.

What is claimed is:

1. An internal reflection element for use in internal reflection spectroscopy, comprising a substantially radiation transparent body having a relatively high index of refraction, a frustrated total reflection film having a relatively low index of refraction on a surface portion of said body, and an interference film having a relatively high index of refraction on the frustrated total reflection film, said body being positioned to receive a beam of radiation and impinge same through the frustrated total reflection film and the interference film on the outer surface of the latter at an angle exceeding the critical angle so as to cause said beam to be totally reflected from that outer surface except as attenuated by the presence of an absorbing medium on said outer surface said frustrated total reflection film having characteristics, including thickness, for producing substantial amplitude matching of beam components, and said interference film having characteristics, including thickness, for producing substantial phase matching of said beam components.

2. An internal reflection element as set forth in claim 1 wherein the frustrated total reflection film has a thickness of the order of one wavelength and the interference film has a thickness of the order of one wavelength.

3. An internal reflection element as set forth in claim 2 wherein the body is in the form of a hemicylinder, and the films are provided on the planar surface thereof.

4. An internal reflection element as set forth in claim 2 wherein the body is in the form of a thin plate, and the films are provided on at least one major surface of the plate.

5. In an internal reflection spectrophotometer comprising radiation-beam-producing means for directing a beam of radiation through a substantially transparent internal reflection element having a relatively high index of refraction for interaction with an absorbing medium on an outer surface thereof and beam-analyzing means for determining the intensity of the emergent beam as a function of the beam wavelength, the improvement comprising a pair of superimposed thin films on the portion of the internal reflection element's outer surface to be brought into contact with the absorbing medium, said element being positioned such that the beam of radiation traverses the films to impinge on the outer surface therein at an angle exceeding the critical angle so as to cause said beam to be totally internally reflected from the outer surface except as attenuated by the presence of the absorbing medium, the inner film having a relatively low index of refraction and characteristics including thickness such that the incident beam experiences a reflectivity at its interface with the element for at least one wavelength that substantially matches the reflectivity at the interface of the outer film with the absorbing medium, the outer film having a relatively high index of refraction and characteristics including thickness such that, at said one wavelength, beam comopnents emerging from the interface of the two films are in subs antially phase-cancelling relationship, whereby the radiation tends to be confined in the outer film producing enhanced interaction with the absorbing medium on the surface thereof.

6. A spectrophotometer as set forth in claim 5 wherein the inner film has a thickness of the order of a wavelength and the outer film has a thickness of the order of a wavelength.

References Cited

UNITED STATES PATENTS

| | | | |
|---|---|---|---|
| 3,240,111 | 3/1966 | Sherman et al. | 88—14 |
| 3,308,709 | 3/1967 | Harrick et al. | 88—14 |

OTHER REFERENCES

Heavens: Optical Properties of Thin Solid Films, Butterworth Scientific Publications, London, 1955, pages 231–235.

JEWELL H. PEDERSEN, *Primary Examiner.*

F. L. EVANS, *Assistant Examiner.*

U.S. Cl. X.R.

250—83.3; 350—96, 164; 356—51, 96, 112